United States Patent [19]

Farrall

[11] 4,145,533

[45] Mar. 20, 1979

[54] METHOD FOR RECYCLING REGENERATED CELLULOSE SCRAP

[75] Inventor: Dennis L. Farrall, Hendersonville, N.C.

[73] Assignee: Olin Corporation, Pisgah Forest, N.C.

[21] Appl. No.: 928,182

[22] Filed: Jul. 26, 1978

[51] Int. Cl.$^2$ .............................................. C08B 9/08
[52] U.S. Cl. ................................ 536/60; 264/37; 536/56; 536/57; 536/61
[58] Field of Search ..................... 264/37; 536/60, 56, 536/57, 61; 260/2.3

[56] References Cited

U.S. PATENT DOCUMENTS

| | | | |
|---|---|---|---|
| 2,184,586 | 12/1939 | Donagemma et al. ............ | 536/61 |
| 2,337,928 | 12/1943 | Reichel ............................... | 536/57 |
| 3,758,457 | 9/1973 | Broeck et al. ...................... | 264/37 |
| 3,817,983 | 6/1974 | Tenboreck et al. ................ | 536/61 |
| 3,884,907 | 5/1975 | Laurance et al. .................. | 264/37 |
| 3,884,908 | 5/1975 | Burke et al. ....................... | 536/61 |
| 3,914,130 | 10/1975 | Newcomer ......................... | 536/60 |
| 4,037,039 | 7/1977 | Geyer et al. ....................... | 536/60 |
| 4,060,684 | 11/1977 | Monk ................................. | 264/37 |

Primary Examiner—Ronald W. Griffin
Attorney, Agent, or Firm—Robert W. Habel

[57] ABSTRACT

A method for recycling regenerated cellulose scrap such as uncoated cellophane and rayon produced in the viscose process. The regenerated cellulose scrap is first shredded into relatively small flakes and then emulsion-xanthated at a temperature ranging from 18° to 30° C. in an aqueous solution of sodium hydroxide and carbon disulfide. The amount of regenerated cellulose scrap added to the solution is controlled to maintain the total cellulose concentration at from 3 to 5% by weight of the solution. At least 38% by weight carbon disulfide based on the weight of the cellulose is used in the solution and the solution is made up to contain from about 10.3 to 11.3% by weight sodium hydroxide based on the weight of the solution so that sufficient sodium hydroxide is present to give about 9.5 to 10.5% by weight in the resulting scrap viscose. After emulsion-xanthation, the scrap viscose is blended in amounts up to 15% by weight with conventional production viscose so that up to 8% of the total cellulose in the mixture originates from the scrap cellulose. The mixture is then used to produce high quality regenerated cellulose products such as cellophane.

7 Claims, 1 Drawing Figure

METHOD FOR RECYCLING REGENERATED CELLULOSE SCRAP

BACKGROUND OF THE INVENTION

1. Field of the Invention

This invention relates generally to the recycling of uncoated waste and scrap cellulose obtained during the production of regenerated cellulose by the viscose process, and more particularly to a method for recycling cellulose waste for reuse in the viscose process to produce high quality regenerated cellulose products.

2. Description of the Prior Art

In the production of regenerated cellulose products such as cellophane and rayon, there are a number of stages in the process where waste or scrap materials are produced that cannot be used, such as edge trimmings and ends in addition to downgraded or off-quality film and fiber. Recycling of such waste cellulose has been a need of the industry for years. However, this is difficult if a high quality regenerated cellulose product is to be obtained from the scrap or waste due to the various additives and other materials present in the waste cellulose and degradation that normally occurs to the cellulose in the viscose process. For example, cellophane produced according to the viscose process involves converting cellulose pulp to alkali cellulose, treating the alkali cellulose with carbon disulfide to produce cellulose xanthate dissolving the cellulose xanthate in a caustic soda solution to obtain viscose, and then casting the viscose into a coagulating bath where a coherent web is formed which is subsequently regenerated, washed, desulfured, and bleached. The resulting web is then softened by passing it through a tank containing an aqueous softener solution such as propylene glycol or glycerine, and dried to a moisture content of about .4 to 10%. During the processing and slitting of the uncoated film, trimmed waste and scraps are produced as well as film of inferior quality which cannot be used for its intended purpose.

Various processes have been developed for recovering and purifying the various components of waste cellophane products and recycling such individual components back to the process. For example, U.S. Pat. No. 4,060,684 discloses a process wherein raw materials are recovered from coated and uncoated scrap cellophane by shredding the cellophane to form a relatively fine flake, extracting both plasticizer and coating resin by washing the cellophane flake with an aqueous solution of tetrahydrofuran, removing the spent wash solution, and rapidly evaporating the tetrahydrofuran therefrom while allowing the coating resin to precipitate, drying the extracted cellophane flake to remove retained tetrahydrofuran and recovering the purified cellulose. This process has proved to be very successful where separate recovery of raw materials from coated regenerated cellulose scrap is desired and a purified cellulose is required. Similar but more complex processes are disclosed in U.S. Pat. Nos. 3,758,457 and 3,884,907. These processes are all primarily directed to the recovery of coated waste regenerated cellulose materials and have the drawback in that many processing steps are required to separately recover the various components to obtain pure cellulose for reuse in the viscose process.

Other processes are known for conversion of waste regenerated cellulose for use in the viscose process such as that disclosed in U.S. Pat. No. 2,184,586 wherein waste rayon fibers are washed and dried, treated in a caustic soda solution, pressed to remove excess caustic soda and then disintegrated, the resulting alkali cellulose xanthated with carbon disulfide and dissolved in caustic soda to produce a viscose which is suitable for spinning. However, the viscose prepared in this manner cannot be used to produce high quality cellophane. Still other recovery processes are known such as that disclosed in U.S. Pat. Nos. 3,817,983 and 3,914,130 in which waste cellophane is shredded and purified by removal of softener, followed by ball-milling of the purified material and dispersion of the ball-milled material over the surface of conventionally prepared alkali cellulose either prior to or at the end of the aging of conventional alkali cellulose prepared from wood pulp. The mixed material is then converted into viscose conventionally and cast into film. This process also requires the use of complex and expensive equipment, i.e., ball-milling, and a complicated series of steps in order to obtain the desired results. Another process is disclosed in U.S. Pat. No. 2,337,928 in which reclaimed regenerated cellulose is added to the wood pulp at the start of the viscose process. This technique requires processing the scrap regenerated cellulose through the entire viscose process, and is unsatisfactory since the regenerated cellulose products produced in this manner are of inferior quality due to the degradation that occurs to regenerated cellulose with complete recycling through the viscose process.

SUMMARY OF THE INVENTION

Accordingly, it is an object of this invention to provide a method for recycling uncoated regenerated cellulose obtained in the viscose process that is simple, efficient, and does not require removal of softeners or other components prior to reuse. Another object is to provide a method for recycling regenerated cellulose scrap from which high quality regenerated cellulose products are obtained.

These and other objects of the invention are accomplished by a method for recycling uncoated regenerated cellulose scrap comprising shredding the scrap, emulsion-xanthating the shredded scrap in an aqueous solution of sodium hydroxide and carbon disulfide at a temperature ranging from 18° C. to 30° C. with agitation to produce a gel-free scrap viscose, said solution containing about 10.3 to 11.3% by weight sodium hydroxide based on the weight of the solution so that sufficient sodium hydroxide is present to provide the equivalent of about 9.5 to 10.5% by weight alkali in the scrap viscose, controlling the amount of regenerated cellulose scrap added to the solution to maintain the total cellulose concentration at from 3 to 5% by weight of the solution while using at least 38% by weight carbon disulfide based on the weight of the cellulose in the solution, blending the scrap viscose with conventional production viscose prepared according to the viscose process so that up to 8% by weight of the total cellulose in the mixture is from the scrap cellulose, and using the resulting mixture of scrap viscose and production viscose to produce high quality regenerated cellulose products. Use of the critical process conditions of this invention enables the preparation of a viscose from shredded uncoated regenerated cellulose waste without previous removal of softeners and in a single piece of equipment. The specific sodium hydroxide concentration and temperatures used during emulsion-xanthation are essential to achieve optimum swelling of the waste cellulose and optimum xanthation reaction resulting in a gel-free viscose. The waste viscose produced can then be blended with conventional wood pulp viscose in an amount so that up to 8% by weight of the cellulose in the resulting mixture is derived from the scrap cellulose. Preferably, the waste viscose is blended with the production viscose at the time the production xanthate is being dissolved in dilute caustic soda, thus achieving the blending of the two viscoses with existing production equipment. The volume and concentration of the dilute caustic soda used to dissolve the production xanthate can be carefully and easily adjusted so that after blending of the waste viscose the final resulting viscose has the same formulation as specified for regular production viscose.

The emulsion-xanthation solution may also contain a small amount (0.5% by weight of the solution) of a surfactant or emulsifier such as a sulfonated castor oil to achieve more uniform contact of the sodium hydroxide and carbon disulfide with the cellulose during emulsion-xanthation.

In accordance with the invention, it has been discovered that the percentages of sodium hydroxide and carbon disulfide used during emulsion-xanthation are critical if a gel-free waste viscose is to be obtained. Thus, if the concentration of sodium hydroxide used in the solution is greater or less than the specified range of 10.3 to 11.3% by weight, and less than 38% by weight carbon disulfide is used based on the weight of the cellulose, a significant amount of undissolved waste particles and gels are obtained in the waste viscose making it unsuitable for blending with production viscose and the production of high quality regenerated cellulose products. In addition, for best results, the waste regenerated cellulose should be freshly shredded to flakes approximately one inch square or less shortly before emulsion-xanthation and should be free of contamination by other cellulosic material such as paper fibers and wood pulp.

BRIEF DESCRIPTION OF THE DRAWING

In order that the invention may be more readily understood and carried into effect, reference is made to the accompanying drawing and description thereof which are offered by way of illustration only and not in limitation of the invention, the scope of which is defined by the appended claims rather than any description preceding them.

IN THE DRAWING

Figure 1:
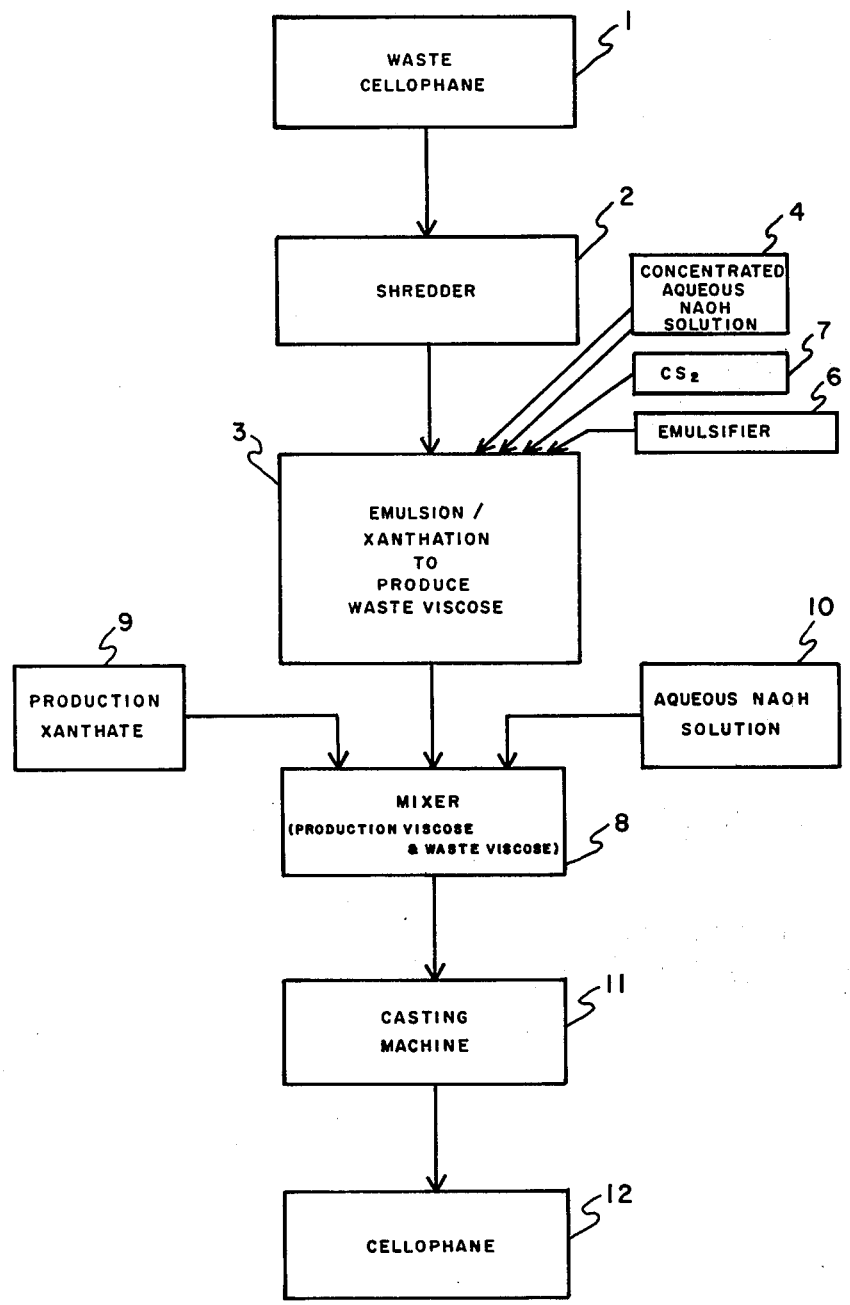

FIGURE 1 is a block diagram showing the material flow and various steps in the process.

DETAILS OF THE INVENTION

Referring to the drawing, uncoated waste cellophane 1 comprising scrap, edge trimmings, ends and inferior quality film, is passed to a shredder 2 where the combined material is chopped and shredded into flakes approximately one inch square or less in size. The waste cellophane used in the process is confined to uncoated scrap, and does not include coated material such as nitrocellulose or polyvinylidene chloride coated waste cellophane since preferably these materials should be reclaimed in a different manner, for example, using the process disclosed in U.S. Pat. No. 4,060,684. While other forms of uncoated waste regenerated cellulose also may be used effectively in the process, such as uncoated rayon fiber or filaments, the waste should be free of wood fiber or paper. The type of softener used in the waste regenerated cellulose material is not critical and the waste can be derived from a mixture of uncoated cellophanes in which a variety of softeners have been employed.

An emulsion-xanthation solution is made up in emulsion-xanthation chamber 3 starting with a quantity of aqueous sodium hydroxide solution 4 at a temperature of approximately 18° C. to 27° C. If desired, a small amount of an emulsifier 6 is then added and the solution moderately agitated. Carbon disulfide from source 7 is then introduced into the solution and agitation continued for a short period at approximately 18° C. to 30° C. to thoroughly mix and dissolve all the ingredients.

After preparation of the emulsion-xanthation solution, shredded waste cellophane comprising approximately 75 to 82% cellulose from shredder 2 is added to the solution in emulsion-xanthation chamber 3 in an amount such that the solution contains from 3 to 5% total cellulose by weight based on the weight of the solution, and the resulting slurry agitated at 18° C. to 30° C. untii a gel-free viscose is obtained. The amounts of sodium hydroxide and carbon disulfide used during the emulsion-xanthation are critical in order to obtain a gel-free waste viscose. The sodium hydroxide solution must be made up to contain from 10.3 to 11.3% sodium hydroxide based on the weight of the solution, and at least 38% carbon disulfide by weight based on the weight of the cellulose. Otherwise, it has been found that the waste viscose will contain undissolved cellulose and gels.

After preparation in emulsion-xanthation chamber 3, the waste viscose is passed to mixer 8 along with simultaneous addition of conventional production xanthate 9 and a dilute aqueous solution of sodium hydroxide 10 in an amount sufficient to produce production viscose from the production xanthate and the entire mixture blended. The amount of waste viscose blended relative to the production viscose obtained from production xanthate and sodium hydroxide should be such that no more than 8% by weight of the total cellulose in the mixed viscose is derived from the waste cellulose. Also, the volume and concentration of the dilute sodium hydroxide used to dissolve the production xanthate is adjusted relative to the concentration of the waste viscose so that after blending the final blended viscoses have the same formulation specified for regular production viscose. While it is preferred to blend the waste viscose with the production xanthate and dilute sodium hydroxide solution as the production viscose is being prepared alternately the waste viscose can be blended directly with previously prepared production visocse for equally good results. Whichever method is employed, the blended mixture is then used in the same manner as conventional viscose and cast using a casting machine 11 into high quality cellophane 12 or other regenerated cellulose products.

EXAMPLE I

Uncoated air dry cellophane waste was comminuted in a Wiley Mill to pass through a screen with holes 1/16 inch square. The waste contained 78% cellulose by weight. 62.5 grams of sodium hydroxide pellets were dissolved in 515 grams of soft water to produce a solution containing 10.8% by weight sodium hydroxide. The solution was cooled to 26° C., after which 1.1 cc of a 25% solution of sulfonated castor oil emulsifier, sold commercially as Calsolene HS, were added and the solution agitated at moderate speed for five minutes.

To the above solution, 11.25 grams of carbon disulfide was then added and agitated for eight minutes at a temperature of 27° C. to 28° C., after which time 36 grams of the comminuted waste cellophane was added while maintaining agitation. In a few minutes, the viscosity of the above mix rose very sharply due to the rapid swelling of the waste cellulose and after a further 15 minutes had dropped very sharply. Agitation was continued a further 20 minutes, by which time a gel-free waste viscose solution existed. The waste viscose resulted in the following formulation (all percentages are by weight unless otherwise stated):

Cellulose: 4.5%
NaOH: 9.85%
$CS_2$: 40.0% (cellulose basis)
Calsolene HS: 1.0% (cellulose basis)

A conventional production viscose was prepared from wood pulp with the following formula:

Cellulose: 8.97%
NaOH: 5.62%
$CS_2$: 26.70% (cellulose basis)

The above two viscoses were blended together in the ratio of 95% by weight production viscose to 5% by weight viscose. The following is a comparison of the properties of the separate viscoses and mixture together with the results obtained when cast into cellophane:

| Sample | NaOH (%) | Cellulose (%) | Viscosity (seconds) | Initial Salt Index | Filtration (g/cm$^1$) |
|---|---|---|---|---|---|
| Waste Viscose | 9.85 | 4.50 | 16 | — | 312 |
| Production Viscose | 5.62 | 8.97 | 208 | 4.3 | 178 |
| Viscose Mixture | 5.57 | 8.93 | 188 | 4.3 | 180 |

| Sample | Gel Swell Index Primary | Gel Swell Index Second | DP Units | Hemi-cellulose in Film (%) |
|---|---|---|---|---|
| Hand-cast Films | | | | |
| Production Viscose | 435 | 251 | 210 | 3.0 |
| Viscose Mixture (95% production viscose + 5% waste viscose) | 446 | 241 | 205 | 3.0 |

EXAMPLE II

A waste viscose containing 4.0% cellulose, 10% sodium hydroxide, and 40% carbon disulfide (cellulose basis) was prepared from granulated uncoated cellophane waste by the same method used in Example I. A second production viscose was prepared conventionally from wood pulp and the two viscoses blended together at the time of dissolving the production xanthate in the ratio of 5.6% waste viscose to 94.4% production viscose. Properties of the blended viscose were as follows:

| Sample | NaOH (%) | Cellulose (%) | Viscosity (seconds) | Filtration (g/cm$^2$) |
|---|---|---|---|---|
| Mixed Viscose containing 2.5% waste cellulose | 5.67 | 9.17 | 325 | 131 |

EXAMPLE III

Two waste viscoses were prepared from granulated uncoated cellophane waste by the same method used in Example I. The first viscose contained 4% cellulose, 40% carbon disulfide based on cellulose, and 11% sodium hydroxide. The second viscose contained the same amount of cellulose and carbon disulfide, but the sodium hydroxide was increased to 12%. The two viscoses had the following properties:

| Sample | Initial Salt Index | Viscosity (seconds) | Filtration (g/cm$^2$) |
|---|---|---|---|
| Waste Viscose with 11% NaOH | 1.7 | 12.6 | 18 |
| Waste Viscose with 12% NaOH | 0.8 | 18.2 | 1.5 |

Inspection of the above viscoses under polarized light showed that the viscose with 11.0% sodium hydroxide contained a significant number of undissolved waste particles and the viscose with 12% sodium hydroxide contained a much larger quantity of undissolved waste particles, whereas a viscose with 10% sodium hydroxide contains a negligible quantity of undissolved waste particles.

EXAMPLE IV

Two viscoses were prepared from granulated uncoated cellophane waste by the same method used in Example I. The first viscose contained 4% cellulose, 40% carbon disulfide based on cellulose, and 9% sodium hydroxide. The second viscose contained the same amount of cellulose and carbon disulfide, but the sodium hydroxide decreased to 8%.

Inspection of these viscoses under polarized light showed that the viscose prepared with 9% sodium hydroxide contained a significant number of undissolved waste particles and the viscose prepared with 8% sodium hydroxide contained a much larger quantity of undissolved waste particles, whereas a viscose prepared with 10% sodium hydroxide contains a negligible quantity of undissolved waste particles.

EXAMPLE V

A viscose was prepared from granulated uncoated cellophane waste by the same method used in Example I. This viscose contained 4% cellulose, 10% sodium hydroxide, but only 35% carbon disulfide based on cellulose.

Inspection of this viscose under polarized light showed a large number of gelled particles, indicating incomplete dissolution of the waste cellulose.

EXAMPLE VI

A viscose was prepared from uncoated waste which had been comminuted in a Condux Mill to give particles of size 3/16 inch square. The viscose contained 4% cellulose, 10% sodium hydroxide, and 40% carbon disulfide based on cellulose. The method of preparing the viscose was the same as used in Example I with the exception that the addition of the carbon disulfide was delayed until 17 minutes after the addition of the waste particles to the caustic soda and Calsolene oil solution.

The resulting viscose was strained through a 120-mesh wire screen. It had a filtration value of 203 g/cm$^2$ and an initial salt index of 4.0, which results indicate a satisfactory state of solution of the waste cellulose xanthate.

During the emulsion-xanthation of the waste alkali cellulose, a peak viscosity develops in the slurry as the cellulose swells before going into solution. The maximum viscosity attained is dependent on the cellulose concentration in the slurry. It is apparent that waste viscoses within the range of 3 to 5% cellulose can be prepared in equipment capable of handling and providing a good mixing of high viscosity slurries.

Blending of the waste viscose with conventional viscose can also be done after dissolving the conventional viscose, by metering the two viscose streams through a static in-line mixer located in the main viscose line between dissolvers and existing blender equipment.

From the foregoing description it will be apparent that the invention provides a unique combination of processing steps and conditions that enables the efficient and effective recycling of waste regenerated cellulose for production of high quality regenerated cellulose products such as cellophane. The preferred embodiments are only illustrative and many variations and modifications may be resorted to without departing from the spirit and scope of the invention, as those skilled in the art will readily understand.

What is claimed is:

1. A method for recycling uncoated regenerated cellulose scrap and waste material comprising (a) shredding the scrap, (b) emulsion-xanthating the shredded scrap in an aqueous solution of sodium hydroxide and carbon disulfide at a temperature ranging between 18° C. to 30° C. to produce a gel-free scrap viscose while controlling the amount of cellulose scrap added to the solution to maintain the total cellulose concentration at from 3 to 5% by weight of the solution, said solution initially containing from about 10.3 to 11.3% sodium hydroxide by weight, and using for xanthation at least 38% carbon disulfide by weight based on the weight of the cellulose, (c) blending the scrap viscose in amounts up to 15% by weight with conventional production viscose, and (d) using the resulting mixture to produce high quality regenerated cellulose products.

2. The method of claim 1 in which the scrap viscose is blended with the production viscose during dissolving of production xanthate with dilute sodium hydroxide.

3. The method of claim 1 in which said emulsion-xanthation solution initially contains approximately 10.8% by weight sodium hydroxide, and for xanthation at least 40% by weight carbon disulfide based on the weight of the cellulose.

4. The method of claim 1 in which the scrap viscose contains from 9.5 to 10.5% by weight equivalent alkali.

5. The method of claim 1 in which up to 8% by weight of the total cellulose in the mixture is derived from the scrap cellulose.

6. The method of claim 1 in which the solution contains a small amount of a surfactant or emulsifier.

7. The method of claim 1 in which the scrap cellulose is cellophane freshly shredded to flakes less than one inch square.

* * * * *